United States Patent [19]

Anderson

[11] 4,092,534

[45] May 30, 1978

[54] CHARGE EXCHANGE SYSTEM

[75] Inventor: Oscar A. Anderson, Berkeley, Calif.

[73] Assignee: The United States of America as represented by the United States Department of Energy, Washington, D.C.

[21] Appl. No.: 743,375

[22] Filed: Nov. 19, 1976

[51] Int. Cl.$^2$ .............................................. G01N 27/78

[52] U.S. Cl. .......................................... 250/251; 176/5

[58] Field of Search ............................... 176/1, 2, 3, 5; 250/251; 313/359-362

[56] References Cited

U.S. PATENT DOCUMENTS

| | | | |
|---|---|---|---|
| 3,300,640 | 1/1967 | Eubank | 250/251 |
| 3,308,323 | 3/1967 | Van de Graaff | 313/360 |
| 3,424,904 | 1/1969 | Donnally | 250/251 |
| 3,657,542 | 4/1972 | Futch, Jr. et al. | 250/251 |
| 3,771,000 | 11/1973 | Willutzki | 313/360 |
| 3,793,550 | 2/1974 | Thompson, Jr. | 313/360 |

OTHER PUBLICATIONS

Rev. Sci., Instrum., vol. 47, No. 6, (6/76), Cosmovici et al., pp. 667-676.

*Primary Examiner*—Samuel Feinberg
*Assistant Examiner*—S. A. Cangialosi
*Attorney, Agent, or Firm*—Dean E. Carlson; Roger S. Gaither; L. E. Carnahan

[57] ABSTRACT

An improved charge exchange system for substantially reducing pumping requirements of excess gas in a controlled thermonuclear reactor high energy neutral beam injector. The charge exchange system utilizes a jet-type blanket which acts simultaneously as the charge exchange medium and as a shield for reflecting excess gas.

6 Claims, 3 Drawing Figures

CHARGE EXCHANGE SYSTEM

BACKGROUND OF THE INVENTION

The invention described herein was made in the course of, or under, Contract No. W-7405-ENG-48 with the U.S. Energy Research and Development Administration.

The invention relates to controlled thermonuclear reactors, particularly to high energy neutral beam injectors for such reactors, and more particularly to an improved charge exchange system for substantially reducing pumping requirements of excess gas in such high energy neutral beam injectors.

As controlled thermonuclear reactors (CTR), such as Tokamaks or mirror systems, advance toward the goal of power production, they will require hundreds of megawatts of neutral beam injection. These beams may use deuterium (D), tritium or $He^3$ atoms; but D atoms are most typical and will be assumed in the following. The need for efficiency in beam generation at D energies of 150 keV or more has led to development efforts for production and acceleration of $D^-$ beams. One such system involves double-charge exchange in a cesium (Cs) cell. The initial goal is to produce a 1-MW beam of $D^o$ at 200 keV. This system as originally planned would be extremely bulky and would emit enormous amounts of excess $D_2$ which would have to be pumped away, since it was previously considered necessary to keep excess $D_2$ emitted from the $D^+$ source from reaching the Cs cell. In this previous system, a 2-meter pumping space was specified between source and cell, and a 500,000 l/sec pumping speed was required. The beam divergence over the 2-meter drift space would have been excessive. It has been speculated that the drift space might be shortened if $D_2$ can be gettered by liquid Cs. However, it is now known that Cs does not getter $D_2$ at the prevailing wall temperature. Thus, this prior system would have been very large, both in length and girth, and this space requirement would have precluded a modular approach to large total beam currents. Thus, a need exists in high-energy neutral beam systems for means for substantially reducing pumping requirements for handling excess gas emitted in such a double-charge exchange cell arrangement.

SUMMARY OF THE INVENTION

The present invention provides an improved charge exchange system for a compact high-energy neutral beam injector for CTR application. The invention is based on a previously neglected effect that a cesium jet can act simultaneously to produce $D^-$ and to reflect excess $D_2$. Thus, $D_2$ pumping at the $D^+$ source is unnecessary and the Cs cell can be closely coupled to the $D^+$ source. In this new, closecoupled arrangement both the equipment bulk and the $D_2$ pumping requirements are greatly reduced.

Therefore, it is an object of this invention to provide an improved charge exchange system for high energy neutral beam injectors.

A further object of the invention is to provide an improved charge exchange system for substantially reducing pumping requirements of excess gas in a high energy neutral beam injector.

Another object of the invention is to provide an improved charge exchange system in which a jet-type blanket acts simultaneously as the charge exchange medium and as a shield for reflecting excess gas.

Another object of the invention is to provide an improved charge exchange system wherein a cesium jet can act simultaneously to produce $D^-$ and to reflect excess $D_2$ from reaching the cesium cell, such that $D_2$ pumping at the $D^+$ source is unnecessary and the cesium cell can be closely coupled to the $D^+$ source.

Another object of the invention is facilitating a compact high-energy neutral beam system of modular design and large total power. The modules are compact because of the greatly reduced pumping requirement and because the close-coupled scheme allows very little primary beam expansion; thus the beam diameter is much smaller.

Other objects of the invention will become apparent to those skilled in the art from the following description and accompanying drawings.

DESCRIPTION OF THE INVENTION

Figure 2:
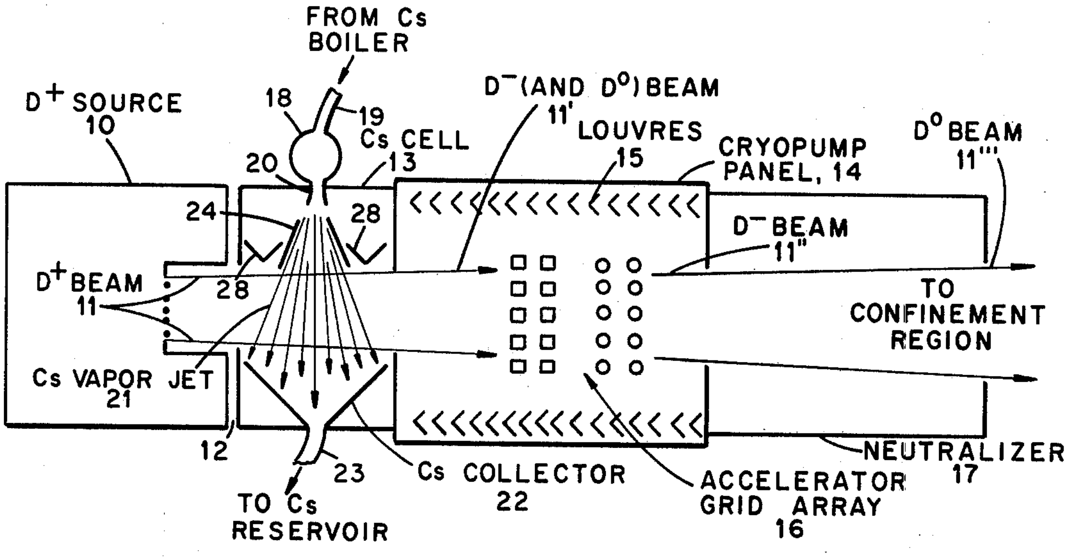
FIG. 2 schematically illustrates an embodiment of a high energy beam injector module utilizing the improved charge exchange system of the invention.

Pumping requirements of excess gas in a controlled thermonuclear reactor (CTR) high energy neutral beam system are substantially reduced by the use of an improved charge exchange system in accordance with this invention. Basically, the invention involves using a cesium (Cs) jet to act simultaneously as the chargechanging mechanism and as a reflector for excess gas. Thus, in a neutral beam injector involving, for example, a $D^+$ beam as shown in FIG. 2;$D_2$ pumping at the $D^+$ source is unnecessary and the Cs cell can be closely coupled to the $D^+$ source.

It was previously believed necessary to pump away the excess $D_2$ in order to prevent degradation of $F^-$ by stripping on $D_2$ ($F^-$ is the fraction of $D^-$ in the output beam). $F^-$ is calculated as a function of the $D_2$ density impinging on the cell, and it is shown, hereinafter, that the previously assumed restrictions may be considerably relaxed. The close-coupled design of the improved cell takes advantage of this result.

Calculations show that a properly arranged Cs cell, rather than adding bulk to the system, can reduce bulk by eliminating a large part of the $D_2$ pumping requirements. It is found that a Cs layer placed close to the $D^+$ source reflects most of the excess $D_2$ back toward the source so that very little pumping is required. It is these $D_2$-Cs collisions which were neglected in the above-mentioned prior system.

There are several attractive features of the close-coupled system of this invention. The shortened length means that the beamdiameter expansion between the source and the cell exit is reduced from about 50–100 cm to almost nothing. The 200 keV $D^-$ accelerator thus also becomes more compact. Because of this, and the elimination of unnecessary pumping, many 200 keV sources can be stacked in the space required for one of the previous sources. However, a possible disadvantage of close coupling is that there will be a higher level of Cs in the source, solutions to this problem being discussed hereinafter.

In the above-mentioned prior charge exchange system, it is assumed that the vapor in the Cs cell does not interfere at all with the flow of $D_2$ gas. Actually, there is a large effect, because the mean free path for $D_2$-Cs collisions is quite short compared with the cell length. The transport cross section for Cs-Cs collisions is $2 \times 10^{-14} cm^2$. Also, the $D_2$-$D_2$ cross section, $8 \times 10^{-16} cm^2$, is well-known. From these figures, we estimate $\sigma = 70 \times 10^{-16} cm^2$ for $D_2$-Cs collisions.

Figure 1:
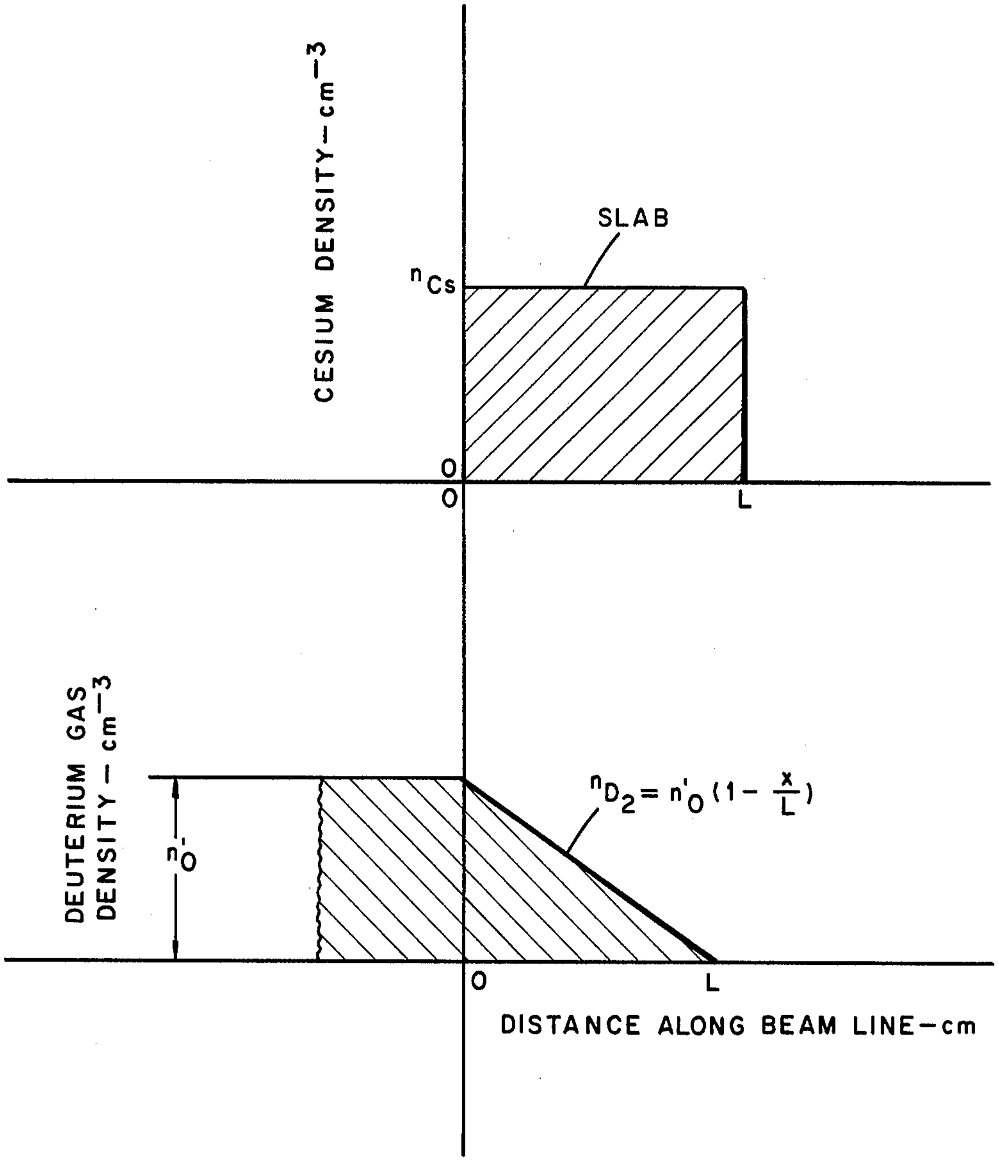
FIG. 1 graphically illustrates a slab model of a cesium cell, showing density profiles for Cs and $D_2$.

For the following analysis, the Cs cell will be represented by a slab model, illustrated in FIG. 1, showing density profiles for Cs and $D_2$. The parameters used in the sample calculation are: $n_{Cs} = 6 \times 10^{14} cm^{-3}$, $n_o' = 2 \times 10^{14} cm^{-3}$ and L = 6 cm. In this one dimensional model, the Cs density $n$ is uniform over a distance L (measured along the beam) and zero elsewhere. The $D_2$ density $n_o'$ is uniform to the left of the slab. The $D_2$ flux $\Gamma$ is uniform everywhere. On the left ($x \leqq 0$), $= \Gamma_s + \Gamma_r$, where $\Gamma_s$ is the flux coming from the source direction and $\Gamma_r$ is the flux reflected by the Cs blanket. Because of the reflected flux, $n_o'$ is much larger than it would be without the blanket. Putting this another way, to achieve a given desired source operating density, the net $\Gamma = \Gamma_s + \Gamma_r$ is much smaller than without the blanket. [See Eq. (11).] The model assumes that there is no reflected flux beyond the slab, so that for $x \geqq L$, $\Gamma$ is the transmitted flux. With these boundary conditions the diffusion equation has the following solution for $D_2$ density:

$$n'(x) = n_o'\left(1 - \frac{\frac{x}{L}}{1 + \frac{\lambda}{2L}}\right) \text{for } 0 \leqq x \leqq L \tag{1}$$

where $$\lambda/L \cong 1/\sigma n L. \tag{2}$$

As seen later, the close-coupling concept is more effective for $nL$ somewhat larger than usually assumed. In the example, $nL = 3.6 \times 10^{15} cm^{-2}$ is used.

Then, $$\frac{\lambda}{L} = \frac{1}{7 \times 10^{-15} \times 3.6 \times 10^{15}} = \frac{1}{25}$$

and Eq. (1) gives $$n'(L) = \frac{n_o'}{1 + \frac{2L}{\lambda}} = \frac{n_o'}{51}. \tag{3}$$

This value, based on the one-dimensional slab model, is generally an over-estimate. In practice, $n'(L)$ is determined by the pumping speed at the Cs cell exit and will be much smaller. This point turns out to be immaterial, however, since even the result [Eq. (3)] is too small to influence the negative-ion fraction $F^-(L)$. Although it is easy to carry the factor $1 + \lambda/2L$ in Eq. (1) through the calculation that follows, the results are somewhat unwieldy. Since there is no significant effect on the result, this term will be set equal to unity so that we have $$n'(x) = n_o'(1 - x/L) \tag{1a}$$

as illustrated in FIG. 1.

We assume a thick target so that we can completely neglect $F^+$ (it disappears rapidly at the entrance to the Cs cell). As in the previous section, we write $n_o' = n_{D_2}$ (0). We use a prime, also, to denote the stripping cross section $\sigma_{-0}'$ on $D_2$; quantities without a prime refer to Cs. Then the equation for the fraction $F^-$ of negative ions in the beam is $$\frac{dF^-}{dx} + \left[n\sigma_{-o} + n\sigma_{o-} + n_o'\sigma'_{-o}\frac{L-x}{L}\right]F^- = n\sigma_{o-}. \tag{4}$$

It is convenient to define the symbols $$\delta \equiv (n_o'\sigma'_{-o}L)^{\frac{1}{2}} \qquad d \equiv \frac{n(\sigma_{-o} + \sigma_{o-})L}{\delta} \tag{5}$$

where the numerator is the number of charge-changing lengths on the cesium in the cell, assumed to be $\gtrsim 3$ or 4. Also, $\delta^2$ would be the number of stripping lengths on $D_2$ in the cell if the density $n'$ at the entrance were maintained throughout the cell instead of obeying Eq. (1a).

Using Eq. (5), the solution of Eq. (4) takes a simple form. We are interested in the beam at the cell exit, where we find $$F^-(L) = \frac{\sigma_{o-}}{\sigma_{o-} + \sigma_{-o}} d\, e^{d^2/2} \int_d^{d+\delta} e^{-w^2/2} dw \tag{6}$$

which can be written in terms of error functions. As asymptotic expansion is useful since $d \gtrsim 4$. To an accuracy of better than $10^{-3}$, $$\int_0^x e^{-w^2/2} dw \cong \frac{e^{-x^2/2}}{x}\left(1 - \frac{1}{x^2}\right) \tag{7}$$

giving $$F^-(L) = \frac{\sigma_{o-}}{\sigma_{o-} + \sigma_{-o}}\left\{1 - \frac{1}{d^2} - \left[1 - \frac{1}{(d+\delta)^2}\right]e^{-d\delta - \frac{\delta^2}{2}}\right\} \tag{8}$$

where we note that $e^{-d\delta} = e^{-n(\sigma_{o-} + \sigma_{-o})L}$ so that Eq. (8) reduces to the usual expression for $F^-$ with pure Cs in the limit $n' \rightarrow 0$. We are interested in the near-equilibrium base where the exponent is large so that this exponential factor is negligible. Then, with the definitions of Eq. (5)

$$F^-(L) = \frac{\sigma_{o-}}{\sigma_{o-} + \sigma_{-o}}\left[1 - \frac{n'\sigma'_{-o}L}{n^2(\sigma_{o-} + \sigma_{-o})^2 L^2}\right] \tag{9}$$

In the example shown in FIG. 1, $n(\sigma_{o-} + \sigma_{-o})L = 4.6$ and $n'\sigma'_{-o}L = 1.2$ so the correction term is $1.2/(4.6)^2 = 0.057$. Thus $$F^-(L) = \frac{\sigma_{o-}}{\sigma_{o-} + \sigma_{-o}} 0.94 = 0.21 \times 0.94 = 0.20 \tag{10}$$

and we see that there is negligible degradation of the $D^-$ beam even with the assumed $D_2$ density of $2 \times 10^{14}$ at the input side of the Cs cell.

The numbers used in Eq. (10) are intended to represent the ultimate in close coupling, i.e., no pumping at all between the arc source and the Cs cell. FIG. 2 shows an embodiment of the close-coupled system. In FIG. 2, a supersonic nozzle produces a Cs jet close to the $D^+$ source, collimated and directed in such a way that the amount of Cs entering the source is within a tolerable level. The source operates at the normal $D_2$ pressure but with greatly reduced $D_2$ flux because of reflections from the Cs "blanket." The same analysis that produced Eq. (1) shows that (in the slab model)

$$\Gamma_t = \frac{\Gamma_s}{1 + \frac{L}{\lambda}} = \frac{\Gamma_s}{26} \qquad (11)$$

where $\Gamma_s$ is the flux incident in the Cs cell (mostly reflected) and $\Gamma_t$ is the flux at the cell exit. There is obviously an appreciable reduction in the amount of pumping needed when this close-coupled system is used.

Of course, the slab model omits some features of the actual system, such as the presence of the extractor grids between the plasma source and the Cs blanket. In the normal system these grids offer some impedance to $D_2$ flow. Thus, the improvement due to the Cs blanket will not be as large as predicted by Eq. (11), but will nevertheless be quite substantial. With the Cs blanket, the net flux is so small that there is very little pressure drop through the extractor grids. This could lead to appreciable charge neutralization within the grid system although this would not necessarily be disadvantageous.

Another difference from the slab model is that the jet is divergent in shape. However, although L becomes smaller near the nozzle, the quantity $n$L, which enters all the equations, is constant.

A more significant difference is that the $D_2$ diffusion problem is not really one-dimensional. That is, there is diffusion in the transverse direction, so that the $D_2$ density $n'$ falls off faster than linearly along the direction of the beam. This will result in an increase in total transmitted flux over the prediction of Eq. (11). This increase will depend on factors such as the way in which collimators are used. In any case, the faster fall off of $n'$ will have the favorable effect of increasing $F^-$.

Finally, the vapor jet will differ from the slab model in not having a square profile along the $x$ direction. Although this complicates the analysis, it probably does not change the conclusions very much. The main problem introduced is a practical one: some Cs will enter the $D^+$ source.

The parameters in the example (FIG. 1), namely, Cs line density $n\mathrm{L} = 3.6 \times 10^{15}\,\mathrm{cm}^{-2}$ and a peak density of about $6 \times 10^{14}\,\mathrm{cm}^{-3}$, are easy to produce. The above-mentioned prior known long-coupled test cell, in fact, has been operated near these parameters, but the Cs density falls off too slowly along the beam line (a condition commonly called "excessive streaming") to be used in a close-coupled arrangement. D'yachkov, Sov. Phys. — Tech. Phys. 14, 686 (1969), using a supersonic L$i$ jet, found large streaming for low values of $n$L but reported that the streaming actually decreases when $n$L is raised above about $10^{15}\,\mathrm{cm}^{-2}$, and becomes quite low for $n\mathrm{L} \gtrsim 4\times 10^{15}$. Subsequent work has shown that streaming may be further reduced by use of skimmers to restrict the spreading of the beam.

Figure 3:
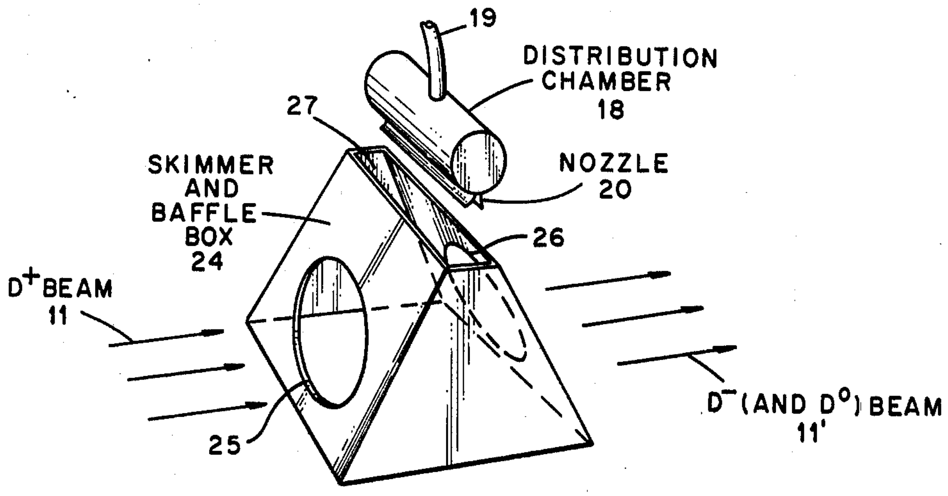
FIG. 3 illustrates portions of the FIG. 2 embodiment in greater detail.

In the present invention, baffles are used around the region where the $D^o-D^-$ beam passes through the Cs jet so that excess $D_2$ from the source cannot bypass the jet; thus, the jet acts as a blanket or shield to reflect excess $D_2$. FIG. 3 is a three-dimensional view of part of the Cs cell in FIG. 2, showing the baffles. These baffles also act as skimmers and, together with the collimators (also shown), reduce the undesirable streaming of the Cs.

Even after the streaming is thus minimized, the close-distance Cs levels might still be unacceptable in some applications. Some fairly simple modifications are possible: if Cs collecting on the extractor grids is a problem, then the grids can be heated. There is also some information that Cs does not tend to wet certain metals such as tantalum.

The walls surrounding the channel between the jet and the source should be realtively cool (about 35° C) to provide Cs pumping. A similar arrangement of hot and cold areas can be advantageous in the arc chamber.

One helpful fact is that any Cs that does enter the arc chamber is quickly ionized and ejected by the extractor, i.e., the ion source itself is a very good pump. The fraction of $Cs^+$ current in the extracted beam is reduced by the square root of the mass-ratio, which is fairly large; nevertheless an excessive fraction must be avoided. This adds emphasis to the importance of producing a well-defined jet.

Referring now to FIG. 2, the illustrated embodiment of a high energy neutral beam injector module utilizing the improved charge exchange system comprises: a $D^+$ source 10 producing, as indicated at 11, a $D^+$ beam at about 1 keV which passes across a short drift space 12, through a baffled Cs cell 13 wherein electrons are attached to beam 11, as known in the art, resulting, as indicated at 11', in a $D^-$ (and $D^o$) beam at about 1 keV, which passes through a cryopump panel 14 containing louvres or baffles 15 located inside the periphery thereof and having a 200 kV accelerator grid array 16 located centrally therein, resulting, as indicated at 11", in a $D^-$ beam at 200 keV which passes through a neutralizer 17 resulting, as indicated at 11''', in a $D^o$beam at 200 keV, which is directed to a confinement region as indicated by legend. The baffled cesium (Cs) cell 13 is provided at the top with a distribution chamber 18 which is supplied with cesium vapor from a Cs boiler as indicated at 19 and terminates in a supersonic nozzle 20 which directs a Cs-vapor jet, shield, or blanket 21 across the $D^+$ beam 11, and is provided, on the opposite side from nozzle 20, with a Cs collector or funnel 22 connected to a Cs reservoir or condenser as indicated at 23.

FIG. 3 illustrates a part of the baffled Cs cell 13 in greater detail composed of a skimmer and baffle box 24 having apertures or openings 25 and 26 through which the beam 11 is directed and provided at the upper end with an opening 27 through which Cs vapor from nozzle 20 is directed to form within box 24 the jet or blanket 21. As seen in FIG. 2, a pair of skimmer collection funnels or baffles 28 are positioned on opposite sides of the box 24 at the upper end thereof to function as above-described to reduce Cs streaming. Thus, the Cs jet, blanket or shield 21 acts simultaneously as the charge exchange medium and as a shield for reflecting excess $D_2$ gas, as described above. Note the relatively small drift space 12, compared to the 2-meter pumping space of the above-mentioned prior, so-called long-coupled exchange cell thereby resulting in a close-coupled $D_2$ source — Cs cell arrangement. The baffled Cs cell 13 also reduces the pumping requirements in the cryopump panel 14 as discussed above. Also, the energy quantities set forth are exemplary only, and not intended to be limiting.

It has thus been shown that the present invention provides an improved charge exchange system which substantially reduces the pumping requirements of excess gas in a high energy neutral beam injector, such as those used in a thermonuclear fusion reactor, thereby overcoming the problems of the prior known systems.

While a particular embodiment of the invention has been illustrated and described, modifications will become apparent to those skilled in the art, and it is intended to cover in the appended claims all such modifications as come within the spirit and scope of the invention.

What I claim is:

1. A method for substantially reducing pumping requirements of excess gas in a neutral beam injector having an energy ranging from about 150 keV to about 200 keV comprising the steps of: passing a beam of particles consisting essentially of a D+ beam through a baffled charge exchange cell containing a vapor consisting essentially of cesium vapor and produced by directing a jet of vapor from a supersonic nozzle across the beam which converts the particles to negative ions; accelerating the thus-produced ions to energies in the range of about 150–200 keV; and then neutralizing the thus-accelerated ions; the vapor in the baffled charge exchange cell acting simultaneously as the charge exchange medium and as a shield for reflecting excess gas.

2. The method defined in claim 1, additionally including the step of producing the beam of particles from a deuterium ion source.

3. The method defined in claim 1, additionally including the step of positioning baffles around the region where the beam intersects the vapor so that excess gas from the beam source cannot escape and so that the vapor acts as the shield to reflect excess gas from the beam source.

4. In a charge exchange cell for neutralizing a D+ beam with Cesium vapor so as to produce a neutral D beam having energies in the range of about 150–200 KeV, the improvement comprising; means for producing a vapor consisting essentially of cesium for converting particles of a D+ beam to negative ions; said means for producing said vapor comprising a chamber connected to receive the vapor from a boiler assembly and provided with supersonic nozzle means for discharging a vapor jet from said chamber across an associated beam to be neutralized, and means for collecting the jet of vapor connected to a reservoir assembly; and means consisting of a plurality of baffles positioned about a portion of said vapor producing means for preventing excess gas from leaking past the cell, the vapor in the cell acting simultaneously as a charge exchange medium and as a shield for reflecting excess gas.

5. The charge exchange cell defined in claim 4, in combination with means for producing the D+ beam, and means for accelerating said beam to an energy range of about 150–200 keV, said charge exchange cell being positioned intermediate said beam producing means and said beam accelerating means and closely adjacent said beam producing means forming a close-coupled source - cell arrangement.

6. The combination defined in claim 5, wherein said beam producing means comprises a deuterium source directing a $D^+$ beam through said charge exchange cell and wherein said vapor is in the form of a jet which acts simultaneously as a charge exchange medium and as a shield for reflecting excess $D_2$ gas, and wherein said beam accelerating means comprises a grid assembly surrounded by a compact cryopump panel assembly and followed by a neutralizer assembly connected to receive the beam from the grid assembly.

* * * * *